(12) United States Patent
Suzuki

(10) Patent No.: US 12,442,916 B2
(45) Date of Patent: Oct. 14, 2025

(54) AXIS DEVIATION DETECTION DEVICE AND AXIS DEVIATION DETECTION PROGRAM

(71) Applicant: DENSO CORPORATION, Kariya (JP)

(72) Inventor: Yasuhiro Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 345 days.

(21) Appl. No.: 17/930,671

(22) Filed: Sep. 8, 2022

(65) Prior Publication Data

US 2023/0003877 A1 Jan. 5, 2023

Related U.S. Application Data

(63) Continuation of application No. PCT/JP2021/008139, filed on Mar. 3, 2021.

(30) Foreign Application Priority Data

Mar. 11, 2020 (JP) ................................. 2020-042049

(51) Int. Cl.
*G01S 13/931* (2020.01)
*G01S 13/68* (2006.01)

(52) U.S. Cl.
CPC ............ *G01S 13/931* (2013.01); *G01S 13/68* (2013.01); *G01S 2013/93271* (2020.01)

(58) Field of Classification Search
CPC ........ G01S 13/931; G01S 13/60; G01S 13/06; G01S 13/589; G01S 7/40; G01S 7/04; G01S 7/4034; G01S 7/497
USPC ...................................................... 342/70, 77
See application file for complete search history.

(56) References Cited

U.S. PATENT DOCUMENTS

| | | | | |
|---|---|---|---|---|
| 5,670,963 A * | 9/1997 | Kubota | ................. | G01S 13/931 342/70 |
| 5,710,565 A * | 1/1998 | Shirai | ...................... | B62D 1/28 342/72 |
| 6,025,797 A * | 2/2000 | Kawai | ................... | G01S 7/4026 342/72 |
| 6,202,027 B1 * | 3/2001 | Alland | ................... | G01S 15/931 340/435 |
| 6,246,949 B1 * | 6/2001 | Shirai | ................... | G01S 17/931 701/96 |
| 6,927,699 B2 * | 8/2005 | Samukawa | ........... | G01S 17/931 340/436 |
| 7,304,602 B2 * | 12/2007 | Shinagawa | ........... | G01S 7/4026 342/146 |
| 8,606,539 B2 * | 12/2013 | Takabayashi | ......... | G01S 7/2955 340/901 |

(Continued)

FOREIGN PATENT DOCUMENTS

| | | | |
|---|---|---|---|
| JP | 2001-066361 A | 3/2001 | |
| JP | 2011-220727 A | 11/2011 | |

*Primary Examiner* — Michael W Justice
(74) *Attorney, Agent, or Firm* — Maschoff Brennan

(57) ABSTRACT

An axis deviation detection device detects a deviation of a central axis of an in-vehicle measurement device that executes measurement using radar waves. The axis deviation detection device performs correction of data that are obtained by the measurement device, to generate first data. Furthermore, the axis deviation detection device generates second data, based on behavior of the vehicle as measured by a sensor unit. The axis deviation detection device then detects the deviation of the central axis, from the first and second data.

5 Claims, 7 Drawing Sheets

(56) References Cited

U.S. PATENT DOCUMENTS

| | | | | |
|---|---|---|---|---|
| 8,781,706 B2* | 7/2014 | Cund | G01S 13/584 | |
| | | | 701/96 | |
| 9,547,077 B2* | 1/2017 | Watanabe | G01S 13/931 | |
| 9,623,905 B2* | 4/2017 | Shashua | G05D 1/0212 | |
| 9,664,789 B2* | 5/2017 | Rosenblum | G06V 20/56 | |
| 10,054,671 B2* | 8/2018 | Satou | G01S 7/4026 | |
| 10,248,129 B2* | 4/2019 | Reed | B60W 10/20 | |
| 10,279,807 B2* | 5/2019 | Adam | B60W 10/06 | |
| 10,302,754 B1* | 5/2019 | Komori | G01S 13/931 | |
| 10,343,696 B2* | 7/2019 | Nishida | B60W 50/0205 | |
| 10,422,857 B2* | 9/2019 | Maennicke | G01S 7/4026 | |
| 10,481,258 B2* | 11/2019 | Matsunaga | B60W 30/09 | |
| 10,538,251 B2* | 1/2020 | Sakima | G08G 1/167 | |
| 10,627,502 B2* | 4/2020 | Kirino | H01Q 1/3233 | |
| 10,656,246 B2* | 5/2020 | Marsch | G01S 13/723 | |
| 11,035,942 B2* | 6/2021 | Lee | G01S 13/343 | |
| 11,047,955 B2* | 6/2021 | Abari | G01S 13/931 | |
| 11,435,474 B2* | 9/2022 | Maas | G01S 13/931 | |
| 11,953,599 B2* | 4/2024 | Toledano | G01S 17/48 | |
| 2005/0285778 A1* | 12/2005 | Shinagawa | G01S 7/4026 | |
| | | | 342/146 | |
| 2006/0103927 A1* | 5/2006 | Samukawa | G01S 17/931 | |
| | | | 359/436 | |
| 2011/0295548 A1* | 12/2011 | Takabayashi | G01S 13/931 | |
| | | | 702/150 | |
| 2011/0295549 A1* | 12/2011 | Takabayashi | G01S 13/86 | |
| | | | 702/142 | |
| 2012/0173185 A1* | 7/2012 | Taylor | G01S 7/4004 | |
| | | | 356/243.1 | |
| 2012/0253549 A1* | 10/2012 | Cund | G01S 13/584 | |
| | | | 701/1 | |
| 2015/0145714 A1* | 5/2015 | Watanabe | G01S 13/38 | |
| | | | 342/107 | |
| 2015/0175166 A1* | 6/2015 | Sakima | B60W 40/072 | |
| | | | 702/157 | |
| 2015/0175167 A1* | 6/2015 | Sakima | B60W 40/06 | |
| | | | 702/157 | |
| 2015/0234045 A1* | 8/2015 | Rosenblum | G01S 13/931 | |
| | | | 342/70 | |
| 2016/0011299 A1* | 1/2016 | Satou | G01S 13/931 | |
| | | | 342/70 | |
| 2016/0209211 A1* | 7/2016 | Song | G01S 7/4972 | |
| 2016/0223649 A1* | 8/2016 | Schwindt | G01S 7/4026 | |
| 2017/0010617 A1* | 1/2017 | Shashua | B60W 60/00 | |
| 2017/0010618 A1* | 1/2017 | Shashua | G05D 1/0246 | |
| 2017/0261600 A1* | 9/2017 | Maennicke | G01S 7/4026 | |
| 2018/0050705 A1* | 2/2018 | Nishida | G01S 13/867 | |
| 2018/0067206 A1* | 3/2018 | Matsunaga | B60T 7/12 | |
| 2018/0237007 A1* | 8/2018 | Adam | B60W 50/14 | |
| 2018/0301817 A1* | 10/2018 | Ichinose | G01S 13/931 | |
| 2018/0307236 A1* | 10/2018 | Reed | B60W 10/18 | |
| 2018/0321367 A1* | 11/2018 | Kirino | G01S 7/41 | |
| 2018/0374352 A1 | 12/2018 | Matsunaga | | |
| 2019/0162837 A1* | 5/2019 | Komori | G01S 13/867 | |
| 2019/0353784 A1* | 11/2019 | Toledano | G05D 1/2435 | |
| 2020/0011970 A1* | 1/2020 | Abari | G01S 13/931 | |
| 2020/0033444 A1* | 1/2020 | Marsch | G01S 13/931 | |
| 2020/0081108 A1* | 3/2020 | Lee | G01S 13/343 | |
| 2020/0088539 A1* | 3/2020 | Shashua | G01C 21/3841 | |
| 2020/0089232 A1* | 3/2020 | Gdalyahu | B60W 60/001 | |
| 2020/0132833 A1* | 4/2020 | Maas | G01S 13/931 | |

* cited by examiner

AXIS DEVIATION DETECTION DEVICE AND AXIS DEVIATION DETECTION PROGRAM

CROSS-REFERENCE TO RELATED APPLICATION

This application is the U.S. bypass application of International Application No. PCT/JP2021/008139, filed on Mar. 3, 2021 which designated the U.S. and claims priority to Japanese Patent Application No. 2020-042049, filed on Mar. 11, 2020, the contents of both of which are incorporated herein by reference.

TECHNICAL FIELD

The present disclosure relates to an axis deviation detection device which uses radar waves for detecting a deviation of a central axis of an in-vehicle measurement device.

BACKGROUND

Detection devices mounted on a vehicle, which detect the position and velocity of an obstacle by transmitting radar waves over a predetermined angle that is in the vehicle width direction, with a central axis extending in the front-rear direction of the vehicle, are known. Furthermore, Japanese Patent No. 3331882 discloses a technique for detecting a deflection (in other words, axis deviation) of a central axis that extends in the front-rear direction of the vehicle, in such a detection device.

SUMMARY

An axis deviation detection device according to one aspect of the present disclosure is configured to detect the deviation of the central axis of an in-vehicle measurement device. The measurement device radiates radar waves while varying the radiation direction over a predetermined angle on both sides of a central axis, and performs measurements on a stationary object by detecting reflected waves of the radiated radar waves. The axis deviation detection device includes a correction unit, a generating unit, a judgement unit, and a detection unit.

The correction unit is configured to correct data that are obtained by the measurements performed by the measurement device, with the correction being executed by a method corresponding to the case in which the travel locus of the vehicle having the measuring apparatus mounted thereon is a predetermined specific travel locus, and is configured to generate first data which express a value relating to the position and/or the velocity of the stationary object. The generating unit is configured to generates second data, which indicate the position and/or velocity of the stationary object, based on the behavior of the vehicle as measured by a sensor unit, which is different from devices that radiate the radar waves and detect the reflected waves. The judgement unit is configured to judge whether the travel locus of the vehicle is the specific travel locus. The detection unit is configured to detect a deviation of the central axis by comparing the first data and second data, where the first data are based on measurements performed by the measurement device in the case in which the judgement unit judges that the travel locus of the vehicle is the specific travel locus, and the second data are based on measurements performed by the sensor unit in the case in which the judgement unit judges that the travel locus of the vehicle is the specific travel locus.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
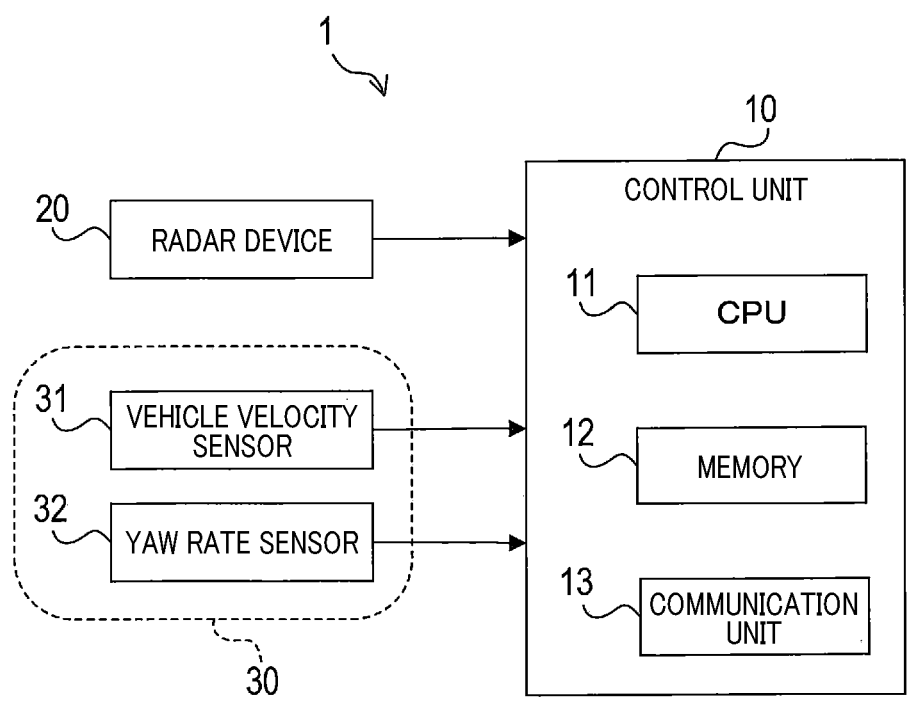
FIG. 1 is a block diagram showing a configuration of a measurement device.

As a result of detailed studies by the assignee of the present invention, it has been found that, depending on the travel locus of the vehicle, the technique disclosed in Japanese Patent No. 3331882 may not be able to accurately detect the axis deviation. For example, when the rate of yaw of the vehicle becomes large, errors may occur in the results of detecting the position and velocity of a stationary obstacle, and as a result, the axis deviation may not be detected accurately.

One aspect of the present disclosure has the object of providing a technique for improving the accuracy of detecting an axis deviation in an in-vehicle measurement device that uses radar waves.

An axis deviation detection device according to one aspect of the present disclosure is configured to detect the deviation of the central axis of an in-vehicle measurement device. The measurement device radiates radar waves while varying the radiation direction over a predetermined angle on both sides of a central axis, and performs measurements on a stationary object by detecting reflected waves of the radiated radar waves. The axis deviation detection device includes a correction unit, a generating unit, a judgement unit, and a detection unit.

The correction unit is configured to correct data that are obtained by the measurements performed by the measurement device, with the correction being executed by a method corresponding to the case in which the travel locus of the vehicle having the measuring apparatus mounted thereon is a predetermined specific travel locus, and is configured to generate first data which express a value relating to the position and/or the velocity of the stationary object. The generating unit is configured to generates second data, which indicate the position and/or velocity of the stationary object, based on the behavior of the vehicle as measured by a sensor unit, which is different from devices that radiate the radar waves and detect the reflected waves. The judgement unit is configured to judge whether the travel locus of the vehicle is the specific travel locus. The detection unit is configured to detect a deviation of the central axis by comparing the first data and second data, where the first data are based on measurements performed by the measurement device in the case in which the judgement unit judges that the travel locus of the vehicle is the specific travel locus, and the second data are based on measurements performed by the sensor unit in the case in which the judgement unit judges that the travel locus of the vehicle is the specific travel locus.

According to the above configuration, in detecting a deviation of the central axis, first data and second data are used, where the first data are based on measurements made by means of radar waves in the case in which the vehicle is traveling along a specific travel locus, and the second data are based on measurements made by means of the sensor unit in the in the case in which the judgement unit judges that the travel locus of the vehicle is the specific travel locus. When the first data are generated, correction is applied by a method corresponding to the specific travel locus, for thereby suppressing an error caused by the travel of the vehicle along the specific travel locus. Hence, the deviation of the central axis is detected by using first data whose accuracy has been improved by the correction. It is thus made possible to improve the accuracy of detecting an axis deviation in an in-vehicle measurement device that utilizes radar waves.

It is also possible to configure an axis deviation detection program for operating a computer as an axis deviation detection device. In that case, the same effects as described above can be obtained, by operating the computer in accordance with such an axis deviation detection program.

Embodiments of the present disclosure are described in the following with reference to the drawings.

1. Configuration

The vehicle-mounted measurement device 1 of the present embodiment is configured to measure the position and/or velocity of an object that is ahead of the vehicle (referred to in the following as the local vehicle) on which the measurement device 1 is mounted (see FIG. 1). The measurement device 1 can measure a single object, or measure each of a plurality of objects in parallel. The object may be a moving body or a stationary object, and the measurement device 1 measures the relative position and relative velocity of the object with respect to the local vehicle. The measurement device 1 includes a control unit 10, a radar device 20, and a sensor unit 30.

The control unit 10 is a unit that performs overall control of the measurement device 1, and includes a CPU 11, a microcomputer having a semiconductor memory (referred to in the following as the memory 12) such as a RAM, ROM, flash memory, etc., and a communication unit 13.

The CPU 11 executes a program stored in the memory 12. Each function of the measurement device 1 is realized by the CPU 11 in executing an axis deviation detection program that is stored in a non-transitional substantive storage medium. In the present embodiment, the memory 12 corresponds to the non-transitional substantive storage medium in which the axis deviation detection program is stored. Furthermore, a method corresponding to the axis deviation detection program is executed by executing the axis deviation detection program. The measurement device 1 may include one or more microcomputers. Furthermore, the method for realizing the functions of the measurement device 1 is not limited to software, and a part or all of the functions may be realized by using electronic circuits. In that case, the electronic circuits may be configured as digital circuits, analog circuits, or a combination thereof.

The communication unit 13 is connected to a communication line such as an in-vehicle LAN (not shown) and communicates with other in-vehicle devices. The in-vehicle LAN may be, for example, a LAN that is compliant with CAN (registered trademark). The measurement device 1 may provide the measurement results that are obtained for an object to an in-vehicle device, via the in-vehicle LAN, for use in driving support or automatic driving, for example.

Figure 2:
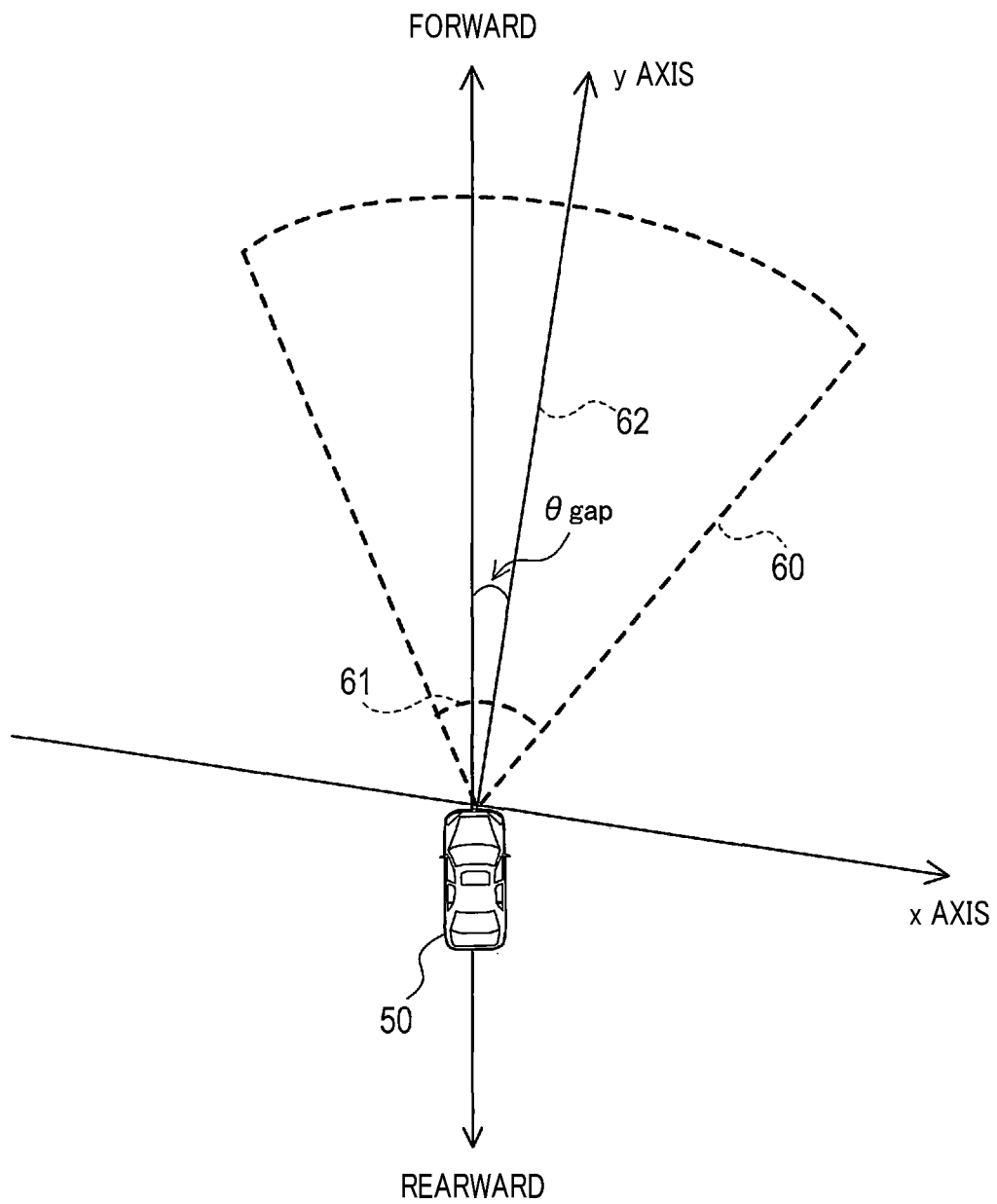
FIG. 2 is an explanatory diagram of a radar wave radiation region.

The radar device 20 is mounted on the front end of the local vehicle 50, and radiates radar waves within a radiation region 60 which spreads in a fan shape ahead of the local vehicle 50, while receiving reflected waves of the radiated radar waves, for thereby executing measurement relating to the position and/or velocity of an object (see FIG. 2). That is, the radar device 20 radiates the radar waves while shifting the radiation direction along the vehicle width direction of the local vehicle 50 over a central angle 61 of the radiation region 60.

A straight line passing through the center of the radiation region 60 is referred to as the central axis 62. The central axis 62 may pass through the center of the radiation region 60 such as to evenly divide the central angle 61 of the radiation region 60 in two. The disclosure is of course, not limited to this, and the central axis 62 may be located on the right side or the left side of the center of the radiation area 60. The central axis is defined as the y-axis, and an axis orthogonal to the central axis is defined as the x-axis. The x-axis and y-axis form an xy coordinate plane, having as origin the origin of the radar waves.

The radar device 20 is mounted on the local vehicle 50 such that the central axis 62 (in other words, the y-axis) coincides with the front-rear direction of the local vehicle 50. However, there may be a deviation between the central axis 62 of the radar device 20 and the front-rear direction of the local vehicle 50. Hereinafter, the angle of the central axis 62 with respect to the front-rear direction of the local vehicle 50 will be referred to as the axis deviation amount or $\theta_{gap}$.

The radar device 20 may be, for example, what is known as a millimeter wave radar, that uses electromagnetic waves in the millimeter-wave band as radar waves, a laser radar that uses a laser beam as radar waves, or a sonar device that uses sound waves as radar waves.

The sensor unit 30 is a part that is different from the radar device 20, and includes at least one sensor for detecting behavior of the local vehicle 50. In the present embodiment, as an example, the sensor unit 30 has a vehicle velocity sensor 31 for measuring the vehicle velocity (hereinafter also referred to as V) and a yaw rate sensor 32 for measuring the yaw rate (hereinafter also referred to as ω) of the local vehicle 50. Hereinafter the yaw rate, and the vehicle velocity measured by the vehicle velocity sensor 31, are also referred to as odometry information. It should be noted that it would be equally possible for the sensor unit 30 to detect behavior of the local vehicle 50 other than the yaw rate or the vehicle velocity.

2. Outline of Processing

The control unit 10 of the measurement device 1 executes measurements relating to the position and/or velocity of an object by tracking the object with an αβ tracker, using a constant velocity linear motion model, based on data generated by the radar device 20 in a period Tm s. It would of course be equally possible for the control unit 10 to perform measurement using, for example, an αβ tracker the employs a different motion model, or to perform measurement using a tracking filter (for example, a Kalman filter) other than a αβ tracker.

The measurement device 1 functions as an axis deviation detection device 1 for detecting the above-mentioned axis deviation. The axis deviation is detected by using measurement data (referred to in the following as the first measurement data) concerning the position and/or the velocity of an object obtained by the measurements executed by the measurement device 1. Data expressing the behavior of the local vehicle 50, obtained by the measurements executed by the sensor unit 30, are referred to in the following as the second measurement data. The control unit 10 detects axis deviation detection based on the first measurement data and second measurement data, which are obtained by measurements performed when the travel locus of the local vehicle 50 is a predetermined specific travel locus (also referred to in the following as a specific travel period).

The control unit 10 corrects the first measurement data by using a method corresponding to the case in which the travel locus of the local vehicle 50 is the specific travel locus, and thereby generates first data based on the corrected first measurement data, expressing values relating to the position and/or velocity of a stationary object. Furthermore, based on the second measurement data, the control unit 10 generates second data, expressing values relating to the position and/or velocity of the stationary object. The control unit then 10 detects the axis deviation by comparing the first data and the second data.

In the present embodiment the specific travel locus is, as an example, a curve which has a radius of curvature within a predetermined range, and which curves in a single direction. The first and second data express, as an example, the angle (hereinafter, also referred to as the vector angle), relative to the y-axis, of the motion direction of a stationary object with respect to the local vehicle 50. θ1 and θ2 in FIGS. 7 and 8 correspond to vector angles. However, it would be equally possible for the first and second data to express values other than vector angles.

3. Axis Deviation Detection Process

Figure 3:
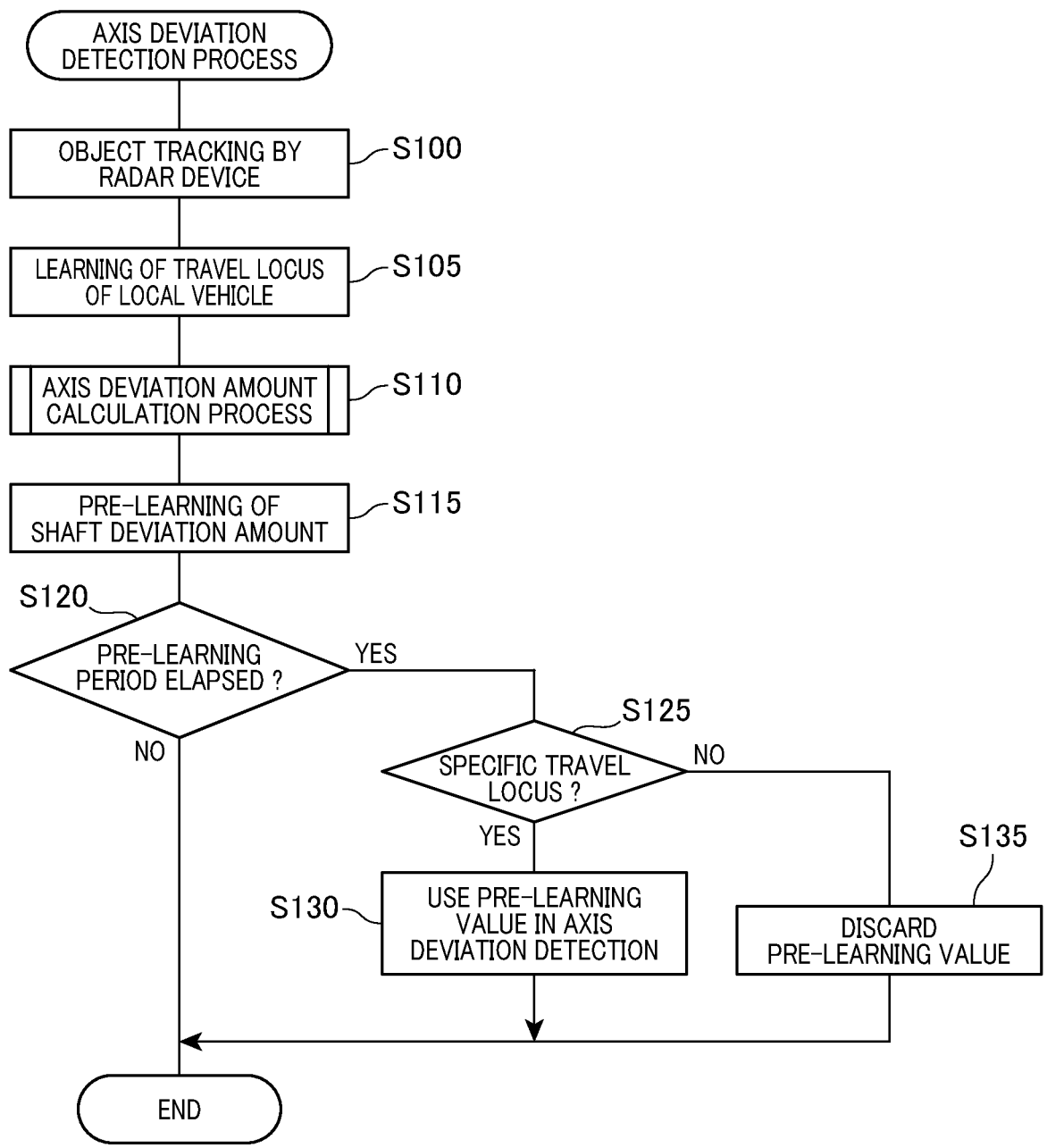
FIG. 3 is a flowchart of axis deviation detection processing.

An axis deviation detection process for detecting an axis deviation in the measurement device 1 will next be described (see FIG. 3). In this process, within each of respective periodically occurring intervals referred to as pre-learning periods, amounts of axis deviation of a stationary object are successively obtained, and the total of the amounts of deviation obtained in a pre-learning period is calculated as a pre-learning value designated as "sum". If it is found that the travel locus of the local vehicle during the pre-learning period was a specific travel locus, the pre-learning value sum is added to a learning value "SUM". That is, the value SUM corresponds to a total of amounts of axis deviation of stationary objects in a specific travel period. This process is periodically executed at intervals of Tm s by the control unit 10 of the measurement device 1, which functions as an axis deviation detection device 1, while the local vehicle 50 is traveling.

In S100, the control unit 10 controls the radar device 20 to measure the position and/or velocity of each of one or more objects that are ahead of the local vehicle 50, to obtain first measurement data for each object. Specifically, the control unit 10 performs object tracking by an αβ tracker based on values of the vehicle velocity and yaw rate of the local vehicle 50, newly obtained by the sensor unit 30, and on data obtained from the radar device 20. First measurement data are thereby generated, which express, with respect to the local vehicle 50, the position ($s_x$, $s_y$) in the xy coordinate plane and the relative velocity vector ($v_x$, $v_y$) of each of one or more objects that are ahead of the local vehicle 50.

It should be noted that it would be equally possible, for example, to measure only the velocity vector ($v_x$, $v_y$) of a stationary object as the first measurement data. In such a case, the control unit 10 could calculate the position ($s_x$, $s_y$) of the stationary object based on measurements of the velocity vector ($v_x$, $v_y$) of the stationary object over a certain period of time, then use the calculated position in processing for detecting the axis deviation. Alternatively, it would be possible to measure only the position of the stationary object ($s_x$, $s_y$) as the first measurement data. In such a case, the control unit 10 could calculate the velocity vector ($v_x$, $v_y$) of the stationary object based on measurements of the position ($s_x$, $s_y$) of the stationary object over a certain period of time, then use the calculated velocity vector in processing for detecting the axis deviation.

In S105, the control unit 10 measures the vehicle velocity and yaw rate of the local vehicle 50 by the sensor unit 30. The control unit 10 then calculates $\Delta x$ and $\Delta y$ based on the vehicle velocity. Here, $\Delta x$ and $\Delta y$ are the distances by which the local vehicle 50 has become displaced in the x-axis direction and the y-axis direction respectively, in the interval from a time point that occurred Tm s previously up to the current time. The control unit 10 also calculates $\Delta\theta$, based on the yaw rate. Here, $\Delta\theta$ is the angle by which the local vehicle 50 is rotationally displaced as it travels along the travel locus, in the interval from the time point Tm s previous up to the current time. That is, values of $\Delta x$, $\Delta y$, and $\Delta\theta$ are calculated periodically in S105, with a period Tm s, and the travel locus of the local vehicle 50 during that pre-learning period is formed by accumulating these periodically calculated values (see FIG. 4).

In S110, the control unit 10 executes axis deviation amount calculation processing, based on the measurement results obtained in S100. As a result, an amount of axial deviation $\theta_{gap}$ corresponding to each of one or more stationary objects is calculated.

In S115, the control unit 10 use the following equation to add the total of the values of $\theta_{gap}$ that have been newly calculated by the axis deviation amount calculation processing to a pre-learning value, "sum". This updates sum for the current pre-learning period.

[Equation 1]

$$\text{sum} = \text{sum} + \Sigma(\theta_{gap}) \quad (1)$$

Furthermore, the following equation (2) is used to add m (an integer of 1 or more), which is the number of stationary objects for which an amount of deviation has been newly calculated, to M, which is the number of times that axis deviations of stationary objects have been detected in the current pre-learning period.

[Equation 2]

$$M = M + m \quad (2)$$

In S120, the control unit 10 judges whether the current pre-learning period has ended. Specifically, a decision is made as to whether a predetermined time $T_{pre}$ (for example, 10 s) has elapsed since the start of the current pre-learning period. If an affirmative decision is obtained (S120: Yes), the control unit 10 then advances the process to S125, while if a negative decision is obtained (S120: No), this execution of the process is ended.

Figure 4:
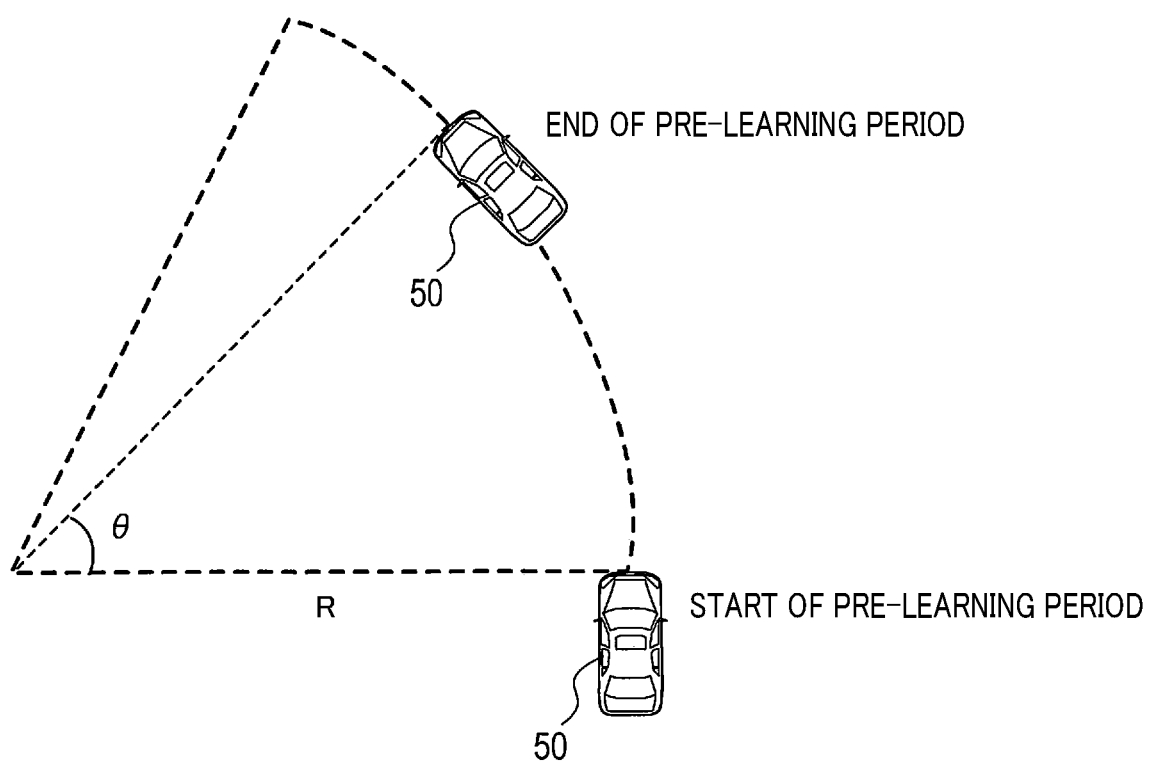
FIG. 4 is an explanatory diagram of a specific travel locus which is a curve.

In S125, the control unit 10 uses $\Delta x_0$ to $\Delta x_1$ and $\Delta y_0$ to $\Delta y_1$, and $\Delta\theta_0$ to $\Delta\theta_1$ to perform calculations, based on the odometry information obtained during the pre-learning period, for judging whether the travel locus during the current pre-learning period has been the specific travel locus (see FIG. 4). Specifically, the control unit 10 calculates the angle $\theta$ through which the local vehicle 50 has rotated in that pre-learning period, by the following equation (3).

[Equation 3]

$$\theta = \sum_{i=0}^{i=I} \Delta\theta_i \qquad (3)$$

Furthermore, the average angular velocity $\omega_{pre}$ of the local vehicle 50 in the current pre-learning period is expressed by the following equation (4).

[Equation 4]

$$\omega_{pre} = \frac{\gamma}{T_{pre}} \qquad (4)$$

The radius of curvature R of the travel locus in the pre-learning period is expressed by the following equation (5) based on the average vehicle velocity $V_{ave}$ of the local vehicle 50 in the current pre-learning period.

[Equation 5]

$$R = \frac{V_{ave}}{\omega_{pre}} \qquad (5)$$

Furthermore, based on equations (4) and (5), the radius of curvature R is expressed by the following equation (6).

[Equation 6]

$$R \cong \frac{V_{ave} \cdot T_{pre}}{\theta} \qquad (6)$$

Furthermore, designating the position coordinates of the local vehicle 50 on the above-mentioned xy plane at the end of the current pre-learning period as X, Y, the radius of curvature R is expressed by the following equation (7).

[Equation 7]

$$R \cong \frac{X+Y}{\theta} \qquad (7)$$

The position coordinates X and Y of the local vehicle 50 at the end of the current pre-learning period are calculated by the following equations (8) and (9), which are based on $\Delta x_i$ and $\Delta y_i$, respectively.

[Equation 8]

$$X = \sum_{i=0}^{i=I} \Delta x_i \qquad (8)$$

[Equation 9]

$$Y = \sum_{i=0}^{i=I} \Delta y_i \qquad (9)$$

The control unit 10 calculates the radius of curvature R by the equations (7) to (9) based on the rotation angle $\theta$ of the local vehicle 50, $\Delta x_o$ to $\Delta x_i$ and $\Delta y_o$ to $\Delta y_i$. The control unit 10 then judges whether R is within a predetermined range. If an affirmative decision is obtained (S125: Yes), the control unit 10 considers that the travel locus in the current pre-learning period has been the specific travel locus, and advances the processing to S130, while if a negative decision is obtained (S125: No), the processing proceeds to S135. Note that it would be equally possible for the control unit 10 to use, as a basis for judging whether the travel locus of the local vehicle 50 during the pre-learning period is a specific travel locus, information other than the yaw rate and the vehicle velocity for indicating the behavior of the local vehicle 50.

In S130, the control unit 10 uses the following equation (10) to update a value "SUM", by adding the total of the axis deviation amounts detected for the current pre-learning period to SUM, which is the total of the amounts of axis deviation detected within a specific travel period.

[Equation 10]

$$\text{SUM}=\text{SUM}+\text{sum} \qquad (10)$$

Furthermore, the control unit 10 uses the following equation (11) to add the number of times M that amounts of axis deviation have been detected in the pre-learning period to the total number N of times of detection of axis deviation amounts within the specific travel period.

[Equation 11]

$$N=N+M \qquad (11)$$

The control unit 10 then uses the following equation (12) to calculate GAP, which is the average value of the amounts of axis deviation obtained based on the measurement results for stationary objects:

[Equation 12]

$$\text{GAP}=\text{SUM}/N \qquad (12)$$

If GAP reaches a predetermined threshold value, the control unit 10 may consider that, due to the effects of the axis deviation, there are errors in object measurements performed by using the radar device 20. In that case, the control unit 10 may correct the measurement data that have been obtained for an object using the radar device 20, with the correction based on the value of GAP.

The control unit 10 then ends this execution of the axis deviation detection process.

On the other hand, if S135 is executed, the control unit 10 discards the pre-learning value sum calculated in the current pre-learning period, and ends this execution of the axis deviation detection process without adding the value of sum to the learning value SUM.

After executing S130 or S135, a new pre-learning period is started the next time the axis deviation detection process is executed. The control unit 10 then initializes the pre-learning value sum of axis deviation amounts and the number M of times of measuring axis deviation amounts in the current pre-learning period.

4. Axis Deviation Calculation Process

Figure 5:
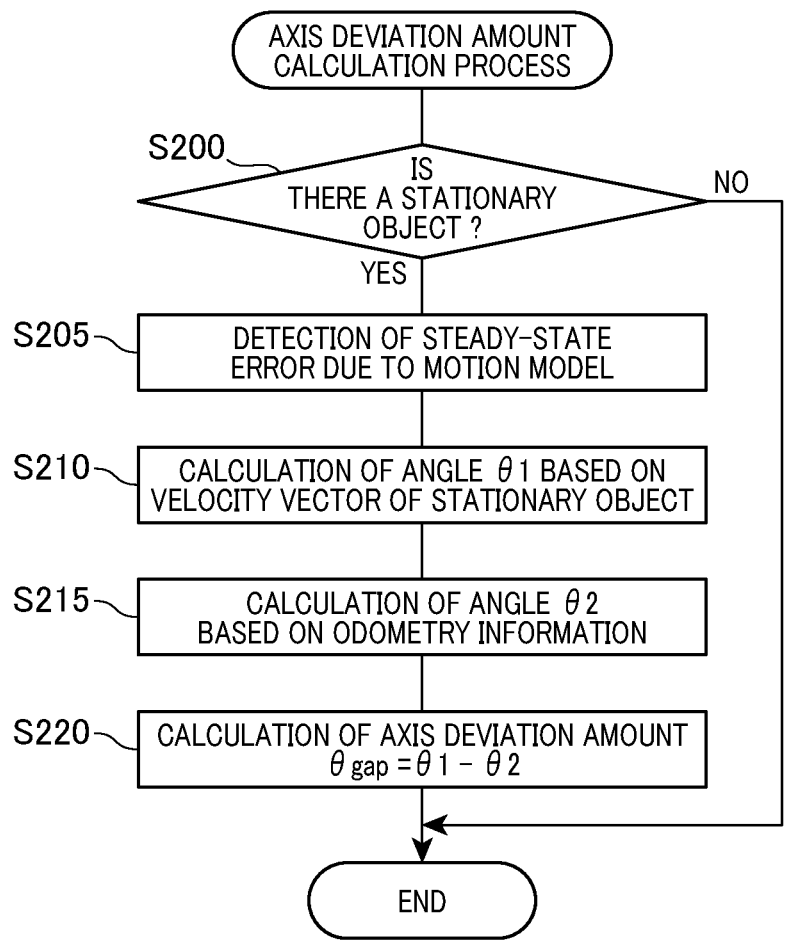
FIG. 5 is a flowchart of axis deviation amount calculation processing.

Next, the axis deviation amount calculation process for calculating the axis deviation amount, based on the measured position values of the stationary object and on a velocity, vector obtained by using the radar device 20, will be described with reference to the flowchart of FIG. 5. This process is configured as a subroutine that is executed from the axis deviation detection process.

In S200, the control unit 10 judges whether a stationary object is included in the objects measured in S100 of the axis deviation detection process. Specifically, for example, the control unit 10 compares the velocity vector of each object measured in S100 with the velocity vector of the local vehicle 50, calculated from the odometry information, to judge, for each object, whether it is a stationary object. If a negative decision is obtained (S200: No), the control unit 10 ends this process. On the other hand, if a positive determination is obtained (S200: Yes), the control unit 10 executes S205 to S220, to calculate respective amounts of deviation of each of the stationary objects measured in S100. That is, the processing of S205 to 220 is performed for each stationary object that is measured in S100.

In S205, the control unit 10 calculates a correction value for a steady-state error contained in the velocity vector ($v_x$, $v_y$) of the stationary object measured in S100. The steady-state error is caused by the fact that the motion model of the αβ tracker is a constant-velocity linear motion model.

Figure 6:
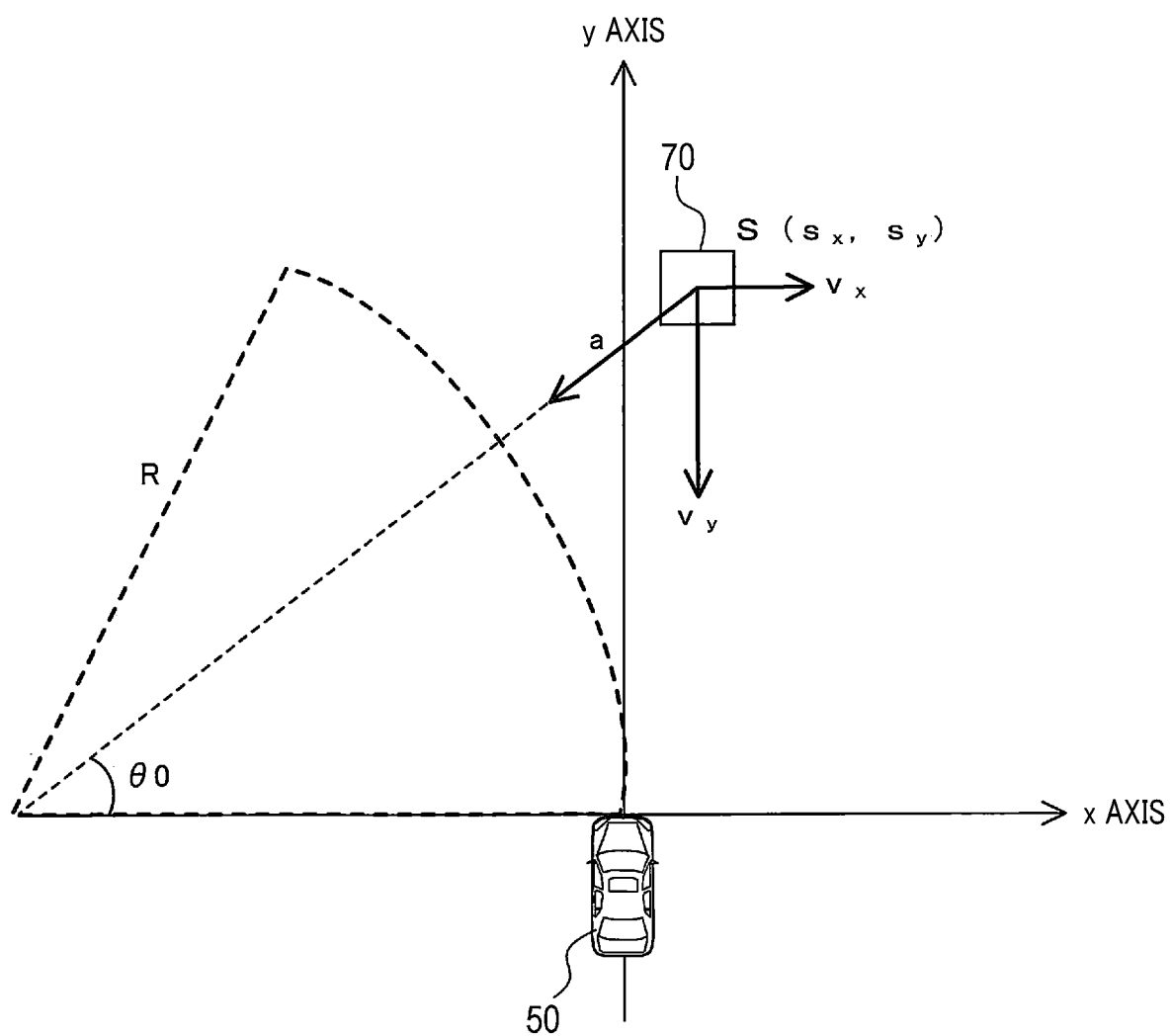
FIG. 6 is an explanatory diagram of a velocity vector and centripetal acceleration generated for a stationary object when the local vehicle travels along a specific travel locus which is a curve.

That is, when the local vehicle 50 is traveling along a specific travel locus which is a curve, a centripetal acceleration directed toward the center of the curve is generated in the stationary object 70 (see FIG. 6). The centripetal acceleration a is a relative acceleration with respect to the local vehicle 50. Therefore, when tracking a stationary object with an αβ tracker, using a constant velocity linear motion model, a steady-state error arises due to the centripetal acceleration a, and the accuracy of measuring the velocity vector is lowered.

However, since the object of measurement is a stationary object 70, it is possible to calculate the centripetal acceleration a of the object. Furthermore, since an αβ tracker is used for tracking the object, it is possible to calculate the steady-state error in the velocity vector. Therefore, the control unit 10 calculates the steady-state error based on the constants α and β in the αβ tracker, and calculates a correction value for the velocity vector.

Specifically, the control unit 10 uses the following equation (13) to calculate an angle θ0 based on the position ($s_x$, $s_y$) of the stationary object 70 obtained in S100 of the axis deviation detection process and the radius of curvature R of the specific travel locus. The radius of curvature R is calculated based on odometry information. θ0 is the angle formed between a straight line connecting the center of the specific travel locus, which is a curve, to the local vehicle, and a straight line connecting the center of the specific travel locus to the position ($s_x$, $s_y$) of the stationary object 70.

[Equation 13]

$$\theta 0 = \tan^{-1}\left(\frac{S_y}{S_y + R}\right) \tag{13}$$

Next, the control unit 10 uses the following equation (14) to calculate the centripetal acceleration a based on the yaw rate ω of the local vehicle 50, obtained as odometry information, and on the radius of curvature R.

[Equation 14]

$$a = -\theta^2 \cdot R \tag{14}$$

Furthermore, the control unit 10 calculates the x-axis direction component $a_x$ and the y-axis direction component $a_y$ of the centripetal acceleration a, by the following equations (15) and (16).

[Equation 15]

$$a_x = a \cdot \cos \theta 0 \tag{15}$$

[Equation 16]

$$a_y = a \cdot \sin \theta 0 \tag{16}$$

The steady-state error e, which arises when a centripetal acceleration a with respect to the local vehicle 50 is produced in the stationary object 70, is expressed by the following equation (17).

[Equation 17]

$$e = (a/\beta) \cdot T^2 \tag{17}$$

Note that T in the equation (17) corresponds to the period in which the object is tracked by the αβ tracker (in other words, the period of the axis deviation detection process). Furthermore, the x-axis direction components and the y-axis direction components of the constants α and β in the αβ tracker are set to $\alpha_x$, $\alpha_y$, $\beta_x$, and $\beta_y$, respectively.

The control unit 10 then calculates the correction value $ve_x$ for the steady-state error that arises in the velocity $v_x$ of the stationary object 70 in the x-axis direction when centripetal acceleration a of the stationary object 70 occurs, using the following equations (18) and (19).

[Equation 18]

$$e_x = (a_x/\beta_x) \cdot T^2 \tag{18}$$

[Equation 19]

$$ve_x = e_x \cdot (\alpha_x - 1)/T \tag{19}$$

The control unit 10 also calculates the correction value $ve_y$ for the steady-state error in the velocity $v_y$ of the stationary object 70 in the y-axis direction when centripetal acceleration a of the stationary object 70 occurs, using the following equations (20) and (21).

[Equation 20]

$$e_y = (a_y/\beta_y) \cdot T^2 \tag{20}$$

[Equation 21]

$$ve_y = e_y \cdot (\alpha_y - 1)/T \tag{21}$$

Figure 7:
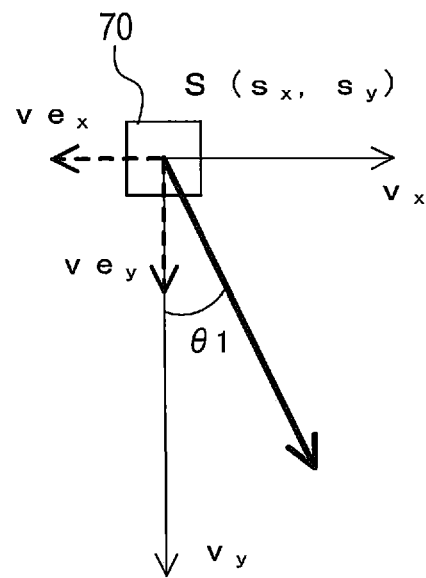
FIG. 7 is an explanatory diagram for a vector angle θ1.

In S210, the control unit 10 uses the following equation (22) to calculate the vector angle θ1 based on the velocity vector ($v_x$, $v_y$) of the stationary object and the correction values $ve_x$ and $ve_y$ of the steady-state error of the stationary object 70 when the centripetal acceleration a is generated (see FIG. 7).

[Equation 22]

$$\theta1=\tan^{-1}((v_x-ve_x)/(v_y-ve_y)) \tag{22}$$

Figure 8:
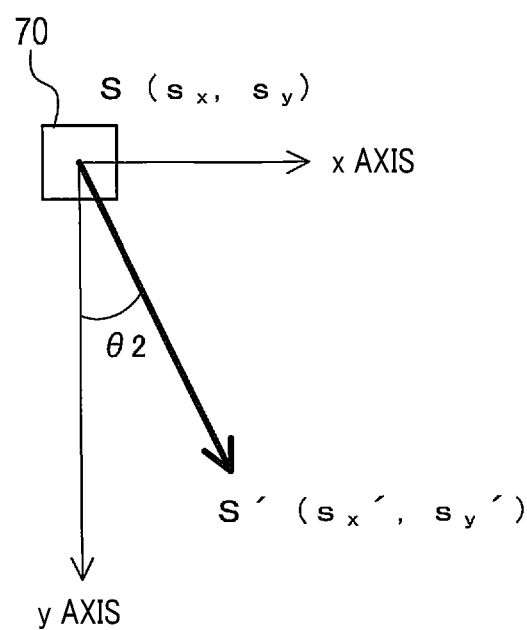
FIG. 8 is an explanatory diagram for a vector angle θ2.

In S215, the control unit 10 calculates the vector angle θ2 by executing an ego motion to predict the behavior of the local vehicle 50 based on the odometry information (see FIG. 8). Specifically, the control unit 10 uses the following equation (23) to calculate the predicted vehicle position ($s_x'$, $s_y'$), based on Δθ, Δx and Δy and on the position ($s_x$, $s_y$) of the stationary object 70.

[Equation 23]

$$\begin{pmatrix} s_x' \\ s_y' \end{pmatrix} = \begin{pmatrix} \cos\Delta\theta & \sin\Delta\theta \\ -\sin\Delta\theta & \cos\Delta\theta \end{pmatrix} \begin{pmatrix} s_x - \Delta x \\ s_y - \Delta y \end{pmatrix} \tag{23}$$

The control unit 10 then calculates the vector angle θ2 by the following equation (24).

[Equation 24]

$$\theta2=\tan^{-1}((s_x'-s_x)/(s_y'-s_y)) \tag{24}$$

It should be noted that it would be equally possible for the control unit 10 to calculate the vector angle θ2 based on information indicating the behavior of the local vehicle 50 other than the yaw rate and the vehicle velocity.

In S220, the control unit 10 calculates the axis deviation amount $\theta_{gap}$ by the following equation (25).

[Equation 25]

$$\theta_{gap}=\theta1-\theta2 \tag{25}$$

Note that $\theta_{gap}$ is calculated based on the results obtained for all of the stationary objects measured in S100. That is, if measurement results form stationary objects are obtained in S100, m values of $\theta_{gap}$ are calculated in S205 to S220.

1-3. Effects

The following effects are obtained with the above embodiment.

(1) A deviation of the central axis 62 is detected by using first data and second data. These are respectively based on first measurement data and second measurement data, which are obtained in the case in which the local vehicle 50 is traveling along a specific travel locus. The first measurement data are obtained using radar waves, and the second measurement data are obtained using the sensor unit 30. In generating the first data, the first measurement data are corrected by a method corresponding to the specific travel locus, for thereby suppressing an error that is generated due to the travel of the local vehicle 50 along the specific travel locus. Thus, the deviation of the central axis 62 is detected by using first data whose accuracy has been improved by the correction. It is thus possible to improve the accuracy of detecting an axis deviation in the measurement device 1.

(2) Furthermore, the first data and second data express respective vector angles.

The axis deviation amount $\theta_{gap}$ is calculated from the difference between the vector angle θ1 expressed by the first data and the vector angle θ2 expressed by the second data. The amount of axis deviation can thus be suitably detected.

(3) The specific travel locus is a curve having a radius of curvature R that is within a predetermined range, and steady-state error correction values $ve_x$ and $ve_y$ are calculated based on the centripetal acceleration a that is produced in the stationary object 70 when the local vehicle 50 travels along the curve. The vector angle θ1 is calculated from the first data after the velocity vector ($v_x$, $v_y$) of the stationary object 70, which constitutes the first measurement data, has been corrected by the correction values. Therefore, for example, even when the local vehicle 50 travels at the entrance or exit of a curve and the rate of yaw becomes large, it is possible to improve the accuracy of detecting the amount of deviation.

(4) Furthermore, the first measurement data are generated through tracking by an αβ tracker, and the correction values $ve_x$ and $ve_y$ for the steady-state error are calculated based on the constants α and β in the αβ tracker. The accuracy of the vector angle θ1, constituting the first data, can thus be improved.

(5) Furthermore, the second measurement data express the yaw rate and vehicle velocity of the local vehicle 50. Hence the vector angle θ2, constituting the second data, can be suitably obtained.

3. Other Embodiments

Although embodiments of the present disclosure have been described above, the present disclosure is not limited to these embodiments, which can be variously modified and implemented.

(1) With the technique disclosed in Japanese Patent No. 3331882 described above, for example, when the vehicle travels along a curve or the like and the rate of yaw becomes large, errors may arise in the measurement results of the position and velocity of a stationary object.

It is therefore desirable to improve the accuracy of the measurement results obtained for a stationary object when the vehicle is traveling along a specific travel locus such as a curve.

Here, the control unit 10 of the measurement device 1 can correct first measurement data, expressing the position and/or velocity of a stationary object 70, by using a method that corresponds to the case in which the local vehicle 50 is traveling along a predetermined specific travel locus. The control unit 10 can then provide the corrected values as measurement results for the position and/or the velocity of the stationary object 70.

That is, when the local vehicle 50 is traveling along the specific travel locus, the control unit 10 can performs the same processing as in S205, based on the velocity $v_x$, $v_y$ measured for the stationary object 70, and the correction values $ve_x$, $ve_y$ for the steady-state error. The control unit 10 can then provide the resultant corrected value as the measurement results for the velocity of the stationary object 70. Specifically, the control unit 10 can calculate, $v_x-ve_x$ and $v_y-ve_y$ as the measurement results for the velocity of the stationary object 70, and may provide the measurement results to a device for performing driving support or automatic vehicle operation.

In that way it is possible to improve the accuracy of measurement of a stationary object 70 when the local vehicle 50 is traveling along a specific travel locus.

(2) In the above embodiment, the axis deviation detection device 1 is configured as a part of a measurement device 1 using radar waves. However, the axis deviation detection device 1 may be configured as a different device from the measurement device 1. Even in such a case, whatever the detection device, it can perform axis deviation detection similarly, by acquiring data such as the first measurement data from a measurement device 1.

(3) In the above embodiment, the specific travel locus is a curve, however for example, a linearly extending locus may be used as the specific travel locus. In that case, as in the above embodiment, the axis deviation detection device 1 can correct the first measurement data by a method corresponding to the specific linearly extending travel locus, to generate the first data, and the axis deviation can then be detected by comparing the first data and the second data.

(4) A plurality of functions possessed by a single component in the above embodiment may be realized by a plurality of components, or a single function possessed by a single component may be realized by a plurality of components. Furthermore, a plurality of functions possessed by a plurality of components may be realized by a single component, or a single function realized by a plurality of components may be realized by a single component. Furthermore, a part of the configuration of the above embodiment may be omitted. Furthermore, at least a part of the configuration of the above embodiment may be supplemented or replaced with the configuration of the other embodiment above.

(5) The axis deviation detection program used in the control unit 10 of the axis deviation detection device 1 may be stored in a computer-readable non-transitory tangible recording medium as instructions to be executed by a computer.

What is claimed is:

1. An axis deviation detection device configured to detect a deviation of a central axis of an in-vehicle measurement device that radiates radar waves while varying the radiation direction over a predetermined angle on both sides of the central axis and that performs measurements on a stationary object by detecting reflected waves of the radiated radar waves, wherein:
    the axis deviation detecting device comprises a storage medium storing instructions and a computer, and the computer executes instructions to perform operations comprising:
        correcting data obtained from the measurements performed by the measurement device, with the correction being executed by a method corresponding to the case in which the travel locus of the vehicle having the measurement device mounted thereon is a predetermined specific travel locus, and configured to generate first data, expressing a value relating to the position and/or the velocity of the stationary object;
        generating second data, which indicate the position and/or velocity of the stationary object, based on behavior of the vehicle as measured by a sensor unit, where the sensor unit is different from devices that radiate the radar waves and detect the reflected waves;
        judging whether the travel locus of the vehicle is the specific travel locus; and
        detecting a deviation of the central axis by comparing the first data and second data, when the first data are based on measurements performed by the measurement device in the case in which the computer judges that the travel locus of the vehicle is the specific travel locus, and the second data are based on measurements performed by the sensor unit in the case in which the computer judges that the travel locus of the vehicle is the specific travel locus,
    the specific travel locus is a curve having a radius of curvature that is within a predetermined range, and
    the computer performs the correction based on the relative centripetal acceleration of the stationary object with respect to the vehicle when the vehicle travels along the specific travel locus.

2. The axis deviation detection device according to claim 1, wherein
    the angle of the velocity of the stationary object relative to the vehicle in the front-rear direction of the vehicle is defined as a vector angle, which is indicated by the first and second data.

3. The axis deviation detection device according to claim 1, wherein
    the measurement by the measurement device is performed using an $\alpha\beta$ tracker, and
    the computer performs the correction based on constants $\alpha$ and $\beta$ of the $\alpha\beta$ tracker.

4. The axis deviation detection device according to claim 1, wherein the yaw rate and vehicle velocity of the vehicle are measured by the sensor unit.

5. One or more non-transitory computer-readable storage media storing an axis deviation detection program for operating a computer as an axis deviation detection device configured to detect a deviation of a central axis of an in-vehicle measurement device that radiates radar waves while varying the radiation direction over a predetermined angle on both sides of the central axis and that performs measurements on a stationary object by detecting reflected waves of the radiated radar waves, wherein:
    the axis deviation detection program operates to:
        correct data obtained from the measurements performed by the measurement device, with the correction being executed by a method corresponding to the case in which the travel locus of the vehicle having the measurement device mounted thereon is a predetermined specific travel locus, and to generate first data, expressing a value relating to the position and/or the velocity of the stationary object;
        generate second data, which indicate the position and/or velocity of the stationary object, based on the behavior of the vehicle as measured by a sensor unit, where the sensor unit is different from the units that radiate the radar waves and detect the reflected waves;
        judge whether the travel locus of the vehicle is the specific travel locus; and
        detect a deviation of the central axis by comparing the first data and second data, when the first data are based on measurements performed by the measurement device in the case in which it is judged that the travel locus of the vehicle is the specific travel locus, and the second data are based on measurements performed by the sensor unit in the case in which the it is judged that the travel locus of the vehicle is the specific travel locus,
    the specific travel locus is a curve having a radius of curvature that is within a predetermined range, and
    the computer performs the correction based on the relative centripetal acceleration of the stationary object with respect to the vehicle when the vehicle travels along the specific travel locus.

\* \* \* \* \*